United States Patent [19]
Koishikawa et al.

[11] Patent Number: 5,671,779
[45] Date of Patent: Sep. 30, 1997

[54] EXHAUST PIPE STRUCTURE IN OUTBOARD ENGINE SYSTEM

[75] Inventors: Kouji Koishikawa; Hiroyuki Murata; Hiroshi Kawamura; Hiroyuki Yoshida, all of Wako, Japan

[73] Assignee: Honda Giken Kogyo Kabushiki Kaisha, Tokyo, Japan

[21] Appl. No.: 578,848

[22] Filed: Dec. 26, 1995

[30] Foreign Application Priority Data

Dec. 26, 1994 [JP] Japan .................... 6-323072

[51] Int. Cl.⁶ .................... F16L 9/00; B63H 21/32
[52] U.S. Cl. .................... 138/109; 440/89; 123/195 P
[58] Field of Search .................... 138/109, 110, 138/177, 178, 112; 440/88, 89, 900; 60/310; 123/195 P

[56] References Cited

U.S. PATENT DOCUMENTS

| | | | |
|---|---|---|---|
| 4,952,182 | 8/1990 | Curtis et al. | 440/89 |
| 5,174,133 | 12/1992 | Deville | 138/44 X |
| 5,324,217 | 6/1994 | Mineo | 440/89 |
| 5,378,180 | 1/1995 | Nakayama et al. | 440/89 |

*Primary Examiner*—Patrick Brinson
*Attorney, Agent, or Firm*—Nikaido Marmelstein Murray & Oram LLP

[57] ABSTRACT

An exhaust pipe for guiding an exhaust gas from an engine into an exhaust gas expansion chamber defined within an extension case is connected to a protrusion of an oil pan which is mounted on a lower surface of a mount case that supports the engine at its upper portion. A breathing bore is formed in an upper portion of the exhaust pipe, and an outer side of the breathing bore is covered with a shield plate. Therefore, water cannot enter the exhaust pipe through the breathing bore. A cooling-water supply pipe for introducing cooling water from a cooling-water pump into the engine is formed with a cooling-water ejection bore which is located at a position in which it is not opposed to the breathing bore. Therefore, even if cooling water is ejected through the cooling-water ejection bore to the exhaust pipe to cool the latter, the cooling water cannot enter the exhaust pipe.

9 Claims, 4 Drawing Sheets

EXHAUST PIPE STRUCTURE IN OUTBOARD ENGINE SYSTEM

BACKGROUND OF THE INVENTION

1. Field of the Invention

The present invention relates to an outboard engine system in which an exhaust pipe extending downwardly from an engine disposed above an extension case has a lower end which opens into an exhaust gas expansion cheer formed within the extension case, and particularly, to an exhaust pipe structure in the outboard engine system.

2. Description of the Related Prior Art

In general, the lower end of the exhaust pipe extending downwardly from the engine of the outboard engine system opens into the exhaust gas expansion cheer that is formed within the extension case, and a breathing bore is formed in an upper portion of the exhaust pipe. However, if the breathing bore is formed in the upper portion of the exhaust pipe, there is a possibility that water which enters from the breathing bore may flow into the exhaust pipe or the engine.

SUMMARY OF THE INVENTION

Accordingly, it is an object of the present invention to reliably inhibit the water from flowing through the breathing bore into the exhaust pipe and into the engine.

To achieve the above object, according to the present invention, there is provided an exhaust pipe structure in an outboard engine system, including an exhaust pipe extending downwardly from an engine disposed above an extension case, in which a lower end of the exhaust pipe opens into an exhaust gas expansion chamber formed within the extension case, and an upper portion of the exhaust pipe is formed with a breathing bore, an outside of the breathing bore being covered with a shield member.

With the above construction, the outside of the breathing bore provided in the upper non-submerged portion of the exhaust pipe is covered with the shield member and therefore, even if water splashes on the exhaust pipe, the water cannot enter into the exhaust pipe and into the engine through the breathing bore.

The above and other objects, features and advantages of the invention will become apparent from the following description of a preferred embodiment taken in conjunction with the accompanying drawings.

DESCRIPTION OF THE PREFERRED EMBODIMENT

Figure 1:
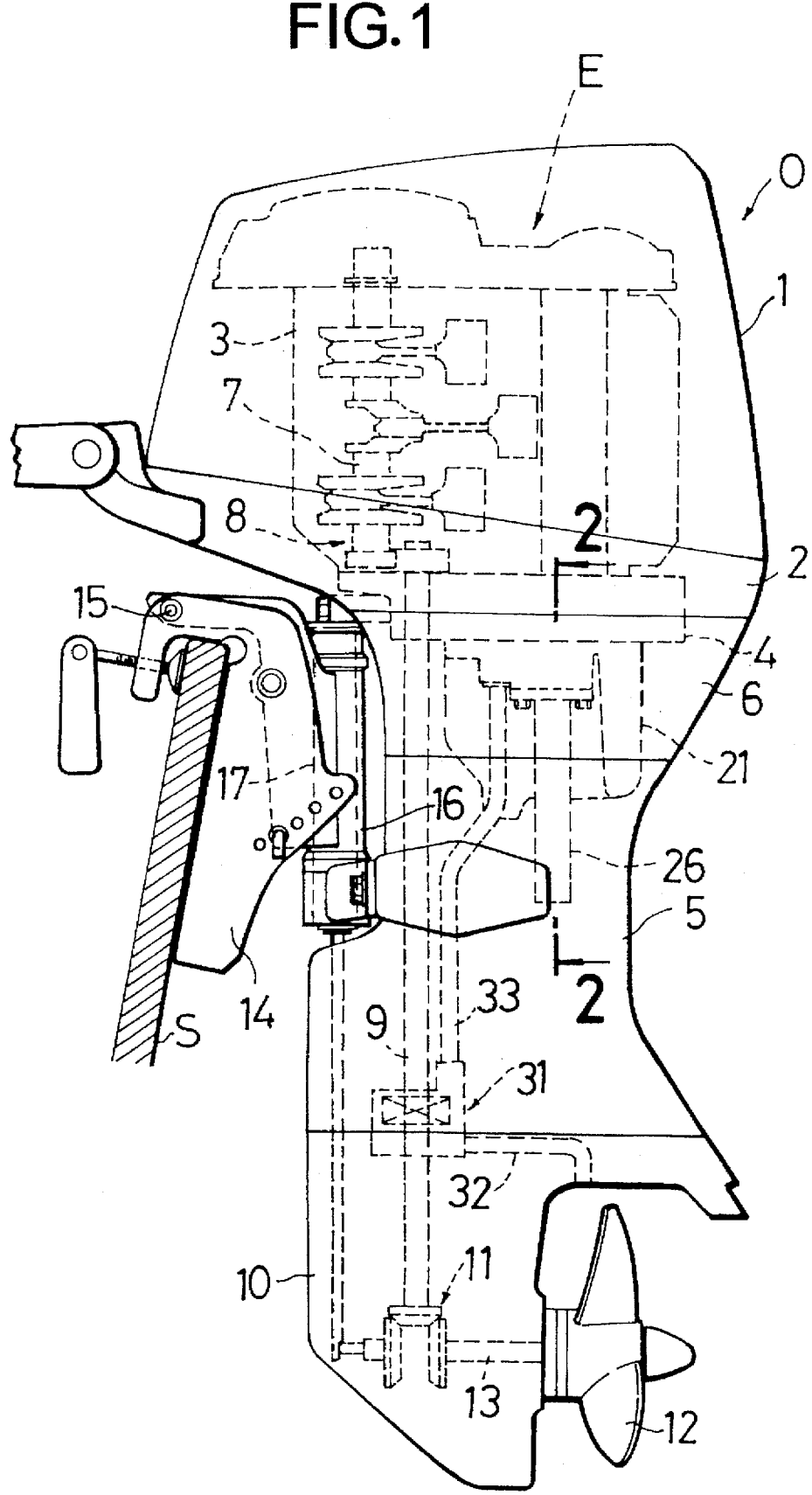
FIG. 1 is a side view of the entire outboard engine system.

Referring to FIG. 1, a 3-cylinder and 4-cycle vertical engine E is mounted at an upper portion of an outboard engine system O and covered at its upper and lower portions with an engine cover 1 and an under-case 2 which are separable from each other. A lower surface of an engine block 3 is coupled to an upper surface of an extension case 5 with a mount case 4 sandwiched therebetween. The extension case 5 is covered at its upper portion with an undercover 6 which is supported at a lower portion of the under-case 2. A driving shaft 9 is connected to a lower end of a crankshaft 7 of the engine E through a speed-reducing mechanism 8, and extends downwardly within the extension case 5. A lower end of the driving shaft 9 is connected to a propeller shaft 13 having a propeller 12 at its rear end, through a bevel gear mechanism 11 which is mounted within a gear case 10.

A stern bracket 14 is detachably fixed to a hull S. A swivel case 16 is vertically swingably carried on the stern bracket 14 through a tilting shaft 15 which extends laterally. The outboard engine system O is laterally swingably carried through a swivel shaft 17 which extends vertically through the swivel case 16.

Figure 2:
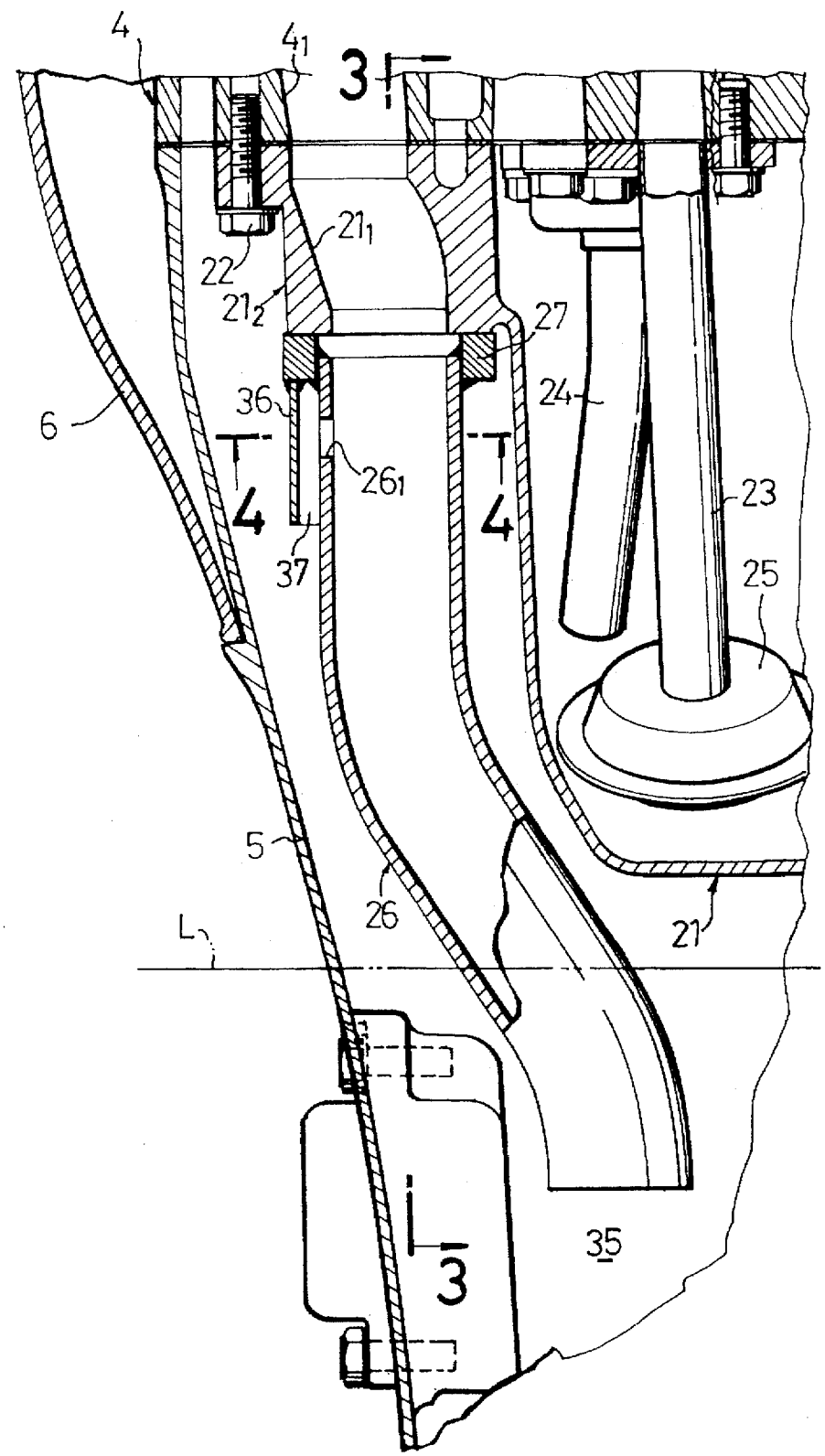
FIG. 2 is an enlarged sectional view taken along a line 2—2 in FIG. 1.
Figure 3:
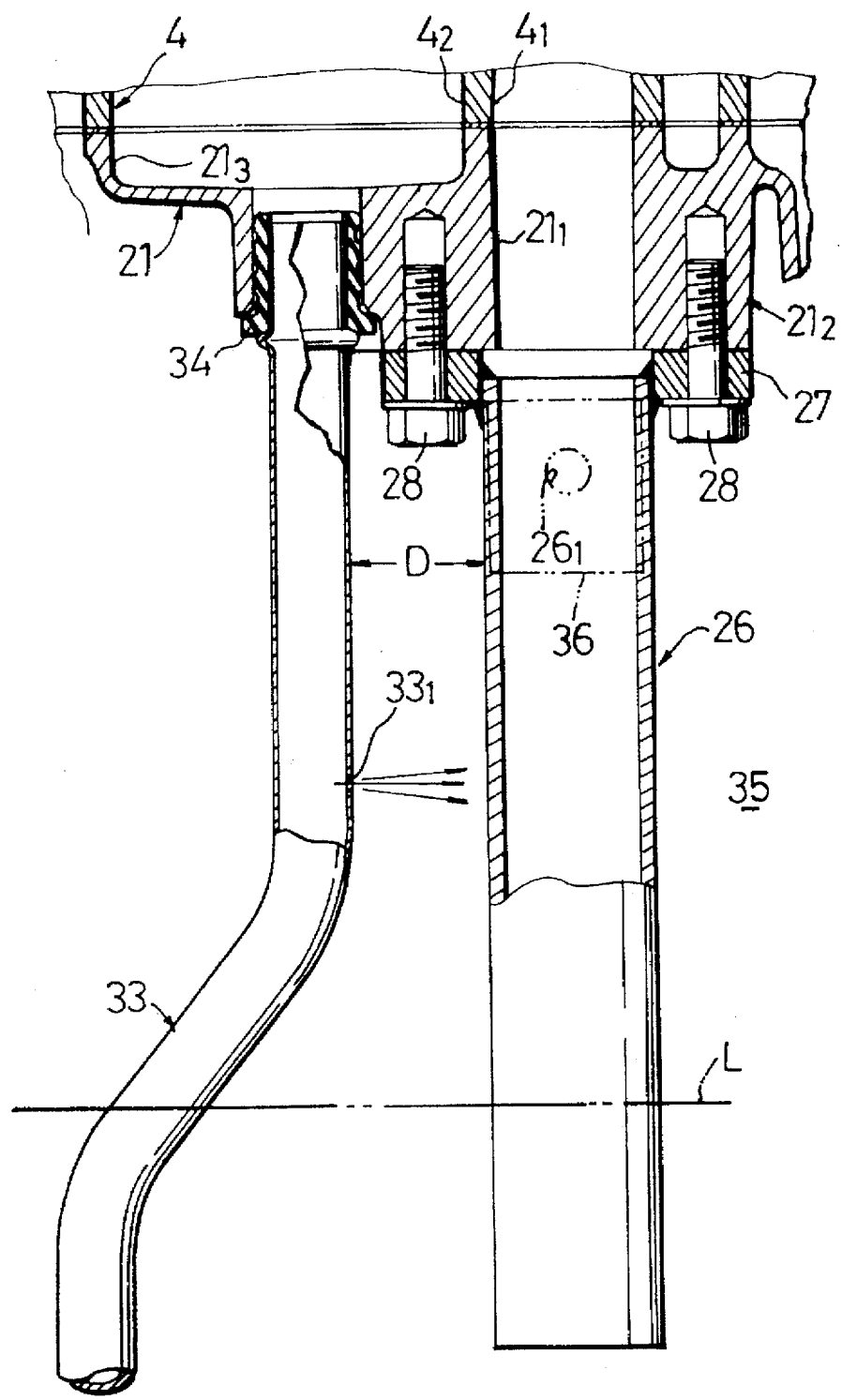
FIG. 3 is a sectional view taken along a line 3—3 in FIG. 2.
Figure 4:
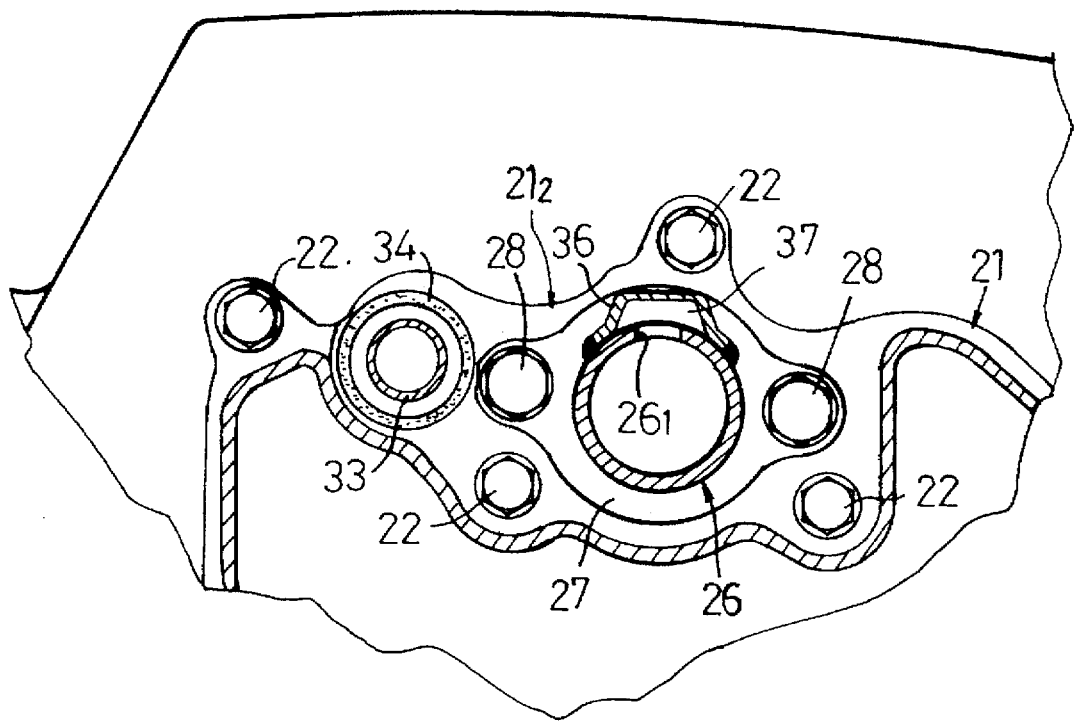
FIG. 4 is a sectional view taken along a line 4—4 in FIG. 2.

As can be seen in FIGS. 2 to 4, an outer peripheral portion of an oil pan 21 at its upper end is fixed to a lower surface of the mount case 4 by a plurality of bolts 22. An oil supply pipe 23 for supplying oil to the engine E opens into the oil pan 21, and an oil return pipe 24 for returning oil from the engine E also opens into the oil pan 21. A strainer 25 is mounted at a lower end of the oil supply pipe 23.

An exhaust passage 41 is connected to an exhaust port in the engine E and extends vertically through the mount case 4. An exhaust passage $21_1$ is connected to a lower end of the exhaust passage $4_1$ and extends vertically through a protrusion $21_2$ which is formed on a left side of the oil pan 21 at its upper end. A flange 27 is welded to an upper end of an exhaust pipe 26 and fixed to the protrusion $21_2$ of the oil pan 21 by two bolts 28, whereby the exhaust passage $21_1$ is connected at its lower end to the exhaust pipe 26. In order to prevent the electrolytic corrosion of the exhaust pipe 26, the exhaust pipe 26 is formed from an aluminum alloy which is the same material as the engine block 3 and the mount case 4.

A cooling-water pump 31 is mounted at an intermediate portion of the driving shaft 9 and connected to an opening in the gear case 10 through a cooling-water introducing pipe 32. A cooling-water supply pipe 33 extends upwardly from the cooling-water pump 31 and is connected at its upper end to a cooling-water passage $21_3$ through a sealing member 34 made of a rubber. The cooling-water passage $21_3$ extends vertically through the oil pan 21. The cooling-water passage $21_3$ of the oil pan 21 is connected at its upper end to a water jacket in the engine E through a cooling-water passage $4_2$ which extends vertically through the mount case 4. The upper portions of the exhaust pipe 26 and the cooling-water supply pipe 33 are disposed parallel to each other and a slight distance D is provided therebetween.

An exhaust gas expansion chamber 35 is formed within the extension case 5, and the lower end of the exhaust pipe 26 opens into the exhaust gas expansion chamber 35. When the engine is stopped, a lower space in the exhaust gas expansion chamber 35 is filled with water. In FIGS. 2 and 3, a reference character "L" indicates a water level or water surface. A breathing bore $26_1$ for permitting the communication of the inside of the exhaust pipe 26 with the exhaust gas expansion chamber 35 is formed in the vicinity of the upper end of the exhaust pipe 26. To cover the breathing bore $26_1$ from the outside, a plate-like closing member 36 is welded at its upper side to a lower surface of the flange 27 of the exhaust pipe 26 and at its left and right opposite sides to an outer peripheral surface of the exhaust pipe 26. Therefore, the breathing bore $26_1$ is covered at its outer front surface with the closing member 36 and communicates with the exhaust gas expansion chamber 35 through an opening 37 which is formed along a lower side of the closing member 36.

A cooling-water ejecting bore $33_1$ for blowing cooling water against the exhaust pipe 26 to cool the latter is formed in the cooling-water supply pipe 33 which extends parallel to and at a distance D from the upper portion of the exhaust pipe 26. The breathing bore $26_1$ is provided at a location above the cooling-water ejection bore $33_1$. The breathing bore $26_1$ is not disposed in front of the cooling-water ejection bore $33_1$, but is disposed to turn sideways with respect to the cooling-water ejection bore $33_1$ through 90° (see FIG. 3).

The operation of the embodiment of the present invention having the above-described construction will be described below.

When the cooling-water pump 31 is driven by the driving shaft 9 during operation of the engine E, the cooling water drawn into the cooling-water pump 31 through the cooling-water introducing pipe 32 is supplied via the cooling-water supply pipe 33 into the water jacket in the engine E. At that time, a portion of the cooling water flowing through the cooling-water supply pipe 33 is ejected from the cooling-water ejection bore $33_1$ toward the exhaust pipe 26 to cool the exhaust pipe 26 which has been heated by exhaust gas passing therethrough.

The exhaust gas from the engine E is passed through the exhaust passage $4_1$ in the mount case 4, the exhaust passage $21_1$ in the oil pan 21 and the exhaust pipe 26 and discharged through the lower end of the exhaust pipe 26 into the exhaust gas expansion chamber 35 defined in the extension case 5.

The breathing bore $26_1$ of the exhaust pipe 26 is disposed at the location above the cooling-water ejection bore $33_1$ in the cooling-water supply pipe 33 and is turned sideways through 90° with respect to the cooling-water ejection bore $33_1$ and moreover, is covered at its outer side with the shield member 36. Therefore, not only the cooling water ejected from the cooling-water ejection bore $33_1$ cannot enter the inside of the exhaust pipe 26 through the breathing bore $26_1$, but also the water splash produced in the exhaust gas expansion chamber 35 cannot enter the inside of the exhaust pipe 26 through the breathing bore $26_1$, thereby effectively preventing the water from flowing into the engine E.

Although the embodiment of the present invention has been described in detail, it will be understood that the present invention is not limited to the above-described embodiment, and various modifications may be made without departing from the spirit and scope of the invention defined in claims.

For example, the breathing bore $26_1$ in the exhaust pipe 26 is provided in the attitude that it is turned sideways through 90° with respect to the cooling-water ejection bore $33_1$ in the embodiment, but the breathing bore $26_1$ may be provided on the opposite side through 180° from the cooling-water ejection bore $33_1$.

What is claimed is:

1. An exhaust pipe structure in an outboard engine system, including an exhaust pipe extending downwardly from an engine disposed above an extension case, in which a lower end of said exhaust pipe opens into an exhaust gas expansion chamber formed within said extension case, and an upper portion of said exhaust pipe is formed with a breathing bore, an outside of said breathing bore being covered with a shield member which extends along a longitudinal direction of said exhaust pipe and has a lower end thereof terminated at a location upwardly of said lower end of the exhaust pipe.

2. An exhaust pipe structure in an outboard engine system, including an exhaust pipe extending downwardly from an engine disposed above an extension case, in which a lower end of said exhaust pipe opens into an exhaust gas expansion chamber formed within said extension case, and an upper portion of said exhaust pipe is formed with a breathing bore, an outside of said breathing bore being covered with a shield member which extends over only a circumferential portion of said exhaust pipe corresponding to said breathing bore.

3. An exhaust pipe structure in an outboard engine system, including an exhaust pipe extending downwardly from an engine disposed above an extension case, in which a lower end of said exhaust pipe opens into an exhaust gas expansion chamber formed within said extension case, and an upper portion of said exhaust pipe is formed with a breathing bore, an outside of said breathing bore being covered with a shield member which is fixed onto said exhaust pipe.

4. An exhaust pipe structure in an outboard engine system having a 4-cycle engine, said structure including an exhaust pipe extending downwardly from said engine disposed above an extension case, in which a lower end of said exhaust pipe opens into an exhaust gas expansion chamber formed within said extension case, and an upper portion of said exhaust pipe is formed with a breathing bore, an outside of said breathing bore being covered with a shield member and wherein an oil pan for said 4-cycle engine is accommodated within said exhaust gas expansion chamber.

5. An exhaust pipe structure in an outboard engine system, including an exhaust pipe extending downwardly from an engine disposed above an extension case, in which a lower end of said exhaust pipe opens into an exhaust gas expansion chamber formed within said extension case, and an upper portion of said exhaust pipe said exhaust pipe is formed with a breathing bore, an outside of said breathing bore being covered with a shield member for shielding said breathing bore from cooling water and wherein said exhaust pipe is disposed adjacent to a water supply pipe.

6. The exhaust pipe structure in an outboard engine system as claimed in claim 5 wherein said water supply pipe comprises a cooling water ejection bore for ejecting water on said exhaust pipe.

7. The exhaust pipe structure for an outboard engine system as claimed in claim 6 wherein said breathing bore is positioned with respect to said cooling water ejecting bore so that there is no operative communication therebetween.

8. The exhaust pipe structure for an outboard engine system as claimed in claim 6 wherein said breathing bore is positioned with respect to said cooling water ejecting bore so that there is no operative communication therebetween, and wherein said breathing bore is disposed at a 90° angle to said cooling water ejecting bore.

9. The exhaust pipe structure for an outboard engine system as claimed in claim 6 wherein said breathing bore is positioned with respect to said cooling water ejecting bore so that there is no operative communication, and wherein said breathing bore is disposed at a 180° angle to said cooling water ejecting bore.

* * * * *